United States Patent
Brunswig et al.

(10) Patent No.: US 7,877,695 B2
(45) Date of Patent: Jan. 25, 2011

(54) TAILORED OBJECT

(75) Inventors: Frank Brunswig, Heidelberg (DE); Martin Hartig, Speyer (DE); Udo Klein, Woerth (DE); Guenter Pecht-Seibert, Muehlhausen (DE); Bare Said, St. Leon-Rot (DE); Abhay Tiple, Sandhausen (DE)

(73) Assignee: SAP AG, Walldorf (DE)

( * ) Notice: Subject to any disclaimer, the term of this patent is extended or adjusted under 35 U.S.C. 154(b) by 548 days.

(21) Appl. No.: 11/646,409

(22) Filed: Dec. 28, 2006

(65) Prior Publication Data

US 2008/0163083 A1 Jul. 3, 2008

(51) Int. Cl.
*G06F 3/00* (2006.01)

(52) U.S. Cl. .................. 715/749; 715/762

(58) Field of Classification Search .......... 715/749, 715/762
See application file for complete search history.

(56) References Cited

U.S. PATENT DOCUMENTS

| | | | | |
|---|---|---|---|---|
| 5,790,779 | A * | 8/1998 | Ben-Natan et al. | 714/39 |
| 7,073,126 | B1 * | 7/2006 | Khandekar | 715/709 |
| 7,207,046 | B1 * | 4/2007 | Van Gerrevink | 719/313 |
| 7,213,209 | B2 * | 5/2007 | Lueckhoff | 715/747 |
| 7,308,410 | B2 * | 12/2007 | Bowe et al. | 705/1 |
| 7,398,473 | B2 * | 7/2008 | Stoner et al. | 715/762 |
| 2002/0178034 | A1 * | 11/2002 | Gardner et al. | 705/5 |
| 2004/0119752 | A1 * | 6/2004 | Beringer et al. | 345/779 |
| 2005/0192851 | A1 * | 9/2005 | Rangnekar | 705/5 |
| 2006/0200516 | A1 * | 9/2006 | Flaherty et al. | 709/201 |
| 2006/0230075 | A1 * | 10/2006 | Greef et al. | 707/200 |
| 2006/0247954 | A1 * | 11/2006 | Hunt | 705/5 |
| 2007/0041564 | A1 * | 2/2007 | Antilli | 379/265.02 |
| 2007/0073562 | A1 * | 3/2007 | Brice et al. | 705/5 |
| 2007/0106722 | A1 * | 5/2007 | Zeldin et al. | 709/201 |
| 2007/0143154 | A1 * | 6/2007 | Ashby et al. | 705/5 |
| 2007/0260495 | A1 * | 11/2007 | Mace et al. | 705/5 |

* cited by examiner

*Primary Examiner*—Dennis-Doon Chow
*Assistant Examiner*—Rashawn Tillery
(74) *Attorney, Agent, or Firm*—Finnegan, Henderson, Farabow, Garrett & Dunner, L.L.P.

(57) ABSTRACT

A system for managing user interface events in user interface of a client system. The system includes a service layer including a business object. The system also includes an intermediate object layer comprising an intermediate object associated with the business object, wherein the intermediate object handles user interface messages raised by the business object and retrieves data from the business object for user interface. The system further includes a service manager that provides the retrieved data from the intermediate object for display on the user interface.

16 Claims, 7 Drawing Sheets

TAILORED OBJECT

FIELD OF THE INVENTION

The present invention relates generally to an enterprise application. More particularly, the present invention relates to user interface tailored business objects.

BACKGROUND OF THE INVENTION

There is, and will continue to be, advances and changes in how enterprises conduct business. Whether these advances and changes occur through growing competition and globalization, mergers and acquisitions, or revamping of business models, the key for success will often depend on how quickly the enterprise's information technology (IT) organization can adapt to evolving business needs. Therefore, a major challenge to these enterprises is how they handle change.

For organizations to enable business agility, they must ensure that enterprise applications are not only high-performance business engines driving efficiencies, but also that they become flexible building blocks of future business systems. A recent promising solution has risen in the form of services. A service, such as a Web service or program, may represent a self-contained, self-describing piece of application functionality that can be found and accessed by other applications. A service may be self-contained because the application using the service does not have to depend on anything other than the service itself, and may be self-describing because all the information on how to use the service can be obtained from the service itself. The descriptions may be centrally stored and accessible through standard mechanisms.

Instead of requiring programmers to establish and maintain links between applications, services may be loosely coupled, making connections simpler and more flexible, and allowing application architects to more easily find and understand services offered by other cooperative applications. However, a problem that exists with services is that they are often designed to expose functionality of individual applications and, thus, may be too limited to be efficient building blocks for enterprise-wide business processes. A solution to this shortfall has been the migration to a Service Oriented Architecture (SOA). The SOA may use an open architecture middleware, which builds on the benefits of services. An example of an SOA can be found in the Enterprise Services Framework (ESF), which is commercially available from SAP AG, Walldorf, Germany. The term "SOA" may also be used to refer to "distributed objects" architecture, such as CORBA (Common Object Request Broker Architecture) and DCOM (Distributed Component Object Model).

An SOA may enable the abstraction of business objects, modeled as services (also referred to as enterprise services), from actual applications. Aggregating services into business-level enterprise services may provide more meaningful building blocks for the task of automating enterprise-scale business scenarios. Enterprise services allow IT organizations to efficiently develop composite applications e.g., applications that compose functionality and information from existing systems to support new business processes or scenarios.

An SOA may also enable the use of an enterprise services repository. The enterprise services repository may store relevant preexisting enterprise services and may make them available for use by, for example, selected partners and customers. By using the enterprise services repository, these selected partners and customers can use the preexisting enterprise services to facilitate the implementation of new services and corresponding business objects. The term business object (BO) represents a physical or logical object that may be significant to a business, such as a purchase order. An "object" generally refers to a software bundle of variables (e.g., data) and related methods. For example, in object-oriented programming, an object may be a concrete realization (instance) of a class that consists of data and the services associated with that data. An example of a business object is a purchase order business object having data and related methods. When a purchase order business object is instantiated, a user may interact with the purchase order by, for example, providing data for fields in the purchase order.

Enterprise services based on business objects, however, face limitations when the services are used in user interface scenarios. In particular, user interface related features, such as success or error messages, copy or paste, and save or load draft, have no business significance. User interface scenarios may thus not be conveniently represented as, or supported by, enterprise services without impacting the design of the underlying business objects.

In a conventional user interface scenario in an SOA, a user interface may fire an event trigger, such as a "Save" event trigger. A service manager may receive the trigger and send a "Save" service operation request to one or more business objects. Some of the business objects may complete the "Save" service operation successfully and raise a success message independently of other business objects. Other business objects, on the other hand, may not complete the "Save" service operation successfully and may raise an error message independently of other objects. Business objects, however, may not collectively raise a single success message or a single error message in response to a single user interface event. When a business object raises an error message independently of others, the aggregation of the error messages for a user display may not be possible. In addition, error messages from business objects may not be suitable for a user interface.

A user interface may also display fields from a node from a business object to a user. Because a business object may not be designed for a user interface, only a subset of the fields may be displayed. Even if a user interface displays only a subset of the fields, however, all fields from a business object may need to be transported to a user interface over networks because removing fields from nodes of a business object may not be possible. This may affect the memory resource management of client systems, server systems, and networks included with or connected to an SOA. In addition, the mapping of error messages originating from fields in nodes of a business object, which may not be displayed on the screen of a user interface, may not be possible. As a result, a user may see an error message unrelated to what the user is viewing on a user interface.

In the view of the foregoing, there is a need for systems and methods for providing an infrastructure to support user interface scenarios in, for example, an SOA, without impacting the design of the underlying business objects.

SUMMARY OF THE INVENTION

Consistent with embodiments of the invention, a system for managing user interface events in user interface of a client system is provided. The system includes a service layer including a business object. The system also includes an intermediate object layer comprising an intermediate object associated with the business object, wherein the intermediate object handles user interface messages raised by the business object and retrieves data from the business object for user interface. The system further includes a service manager that provides the retrieved data from the intermediate object for display on the user interface.

In another embodiment, a method for managing user interface events in user interface of a client system is provided. The method includes implementing an intermediate object layer comprising an intermediate object associated with the business object, wherein the intermediate object handles user interface messages raised by the business object and retrieves data from the business object for user interface. The method further includes integrating the intermediate object layer with a service layer comprising the business object.

In yet another embodiment, a computer-readable medium including instructions to configure a computer to implement a method for managing user interface events in user interface of a client system is provided. The computer-readable medium includes instructions for implementing an intermediate object layer comprising an intermediate object associated with the business object, wherein the intermediate object handles user interface messages raised by the business object and retrieves data from the business object for user interface. The computer-readable medium further includes instructions for integrating the intermediate object layer with a service layer comprising the business object.

It is to be understood that both the foregoing general description and the following detailed description are exemplary and explanatory only, and should not be considered restrictive of the scope of the invention, as claimed. Further, features and/or variations may be provided in addition to those set forth herein. For example, embodiments consistent with the present invention may be directed to various combinations and subcombinations of the features described in the following detailed description.

BRIEF DESCRIPTION OF THE DRAWINGS

The accompanying drawings, which are incorporated in and constitute a part of this specification, illustrate various embodiments and aspects of the present invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
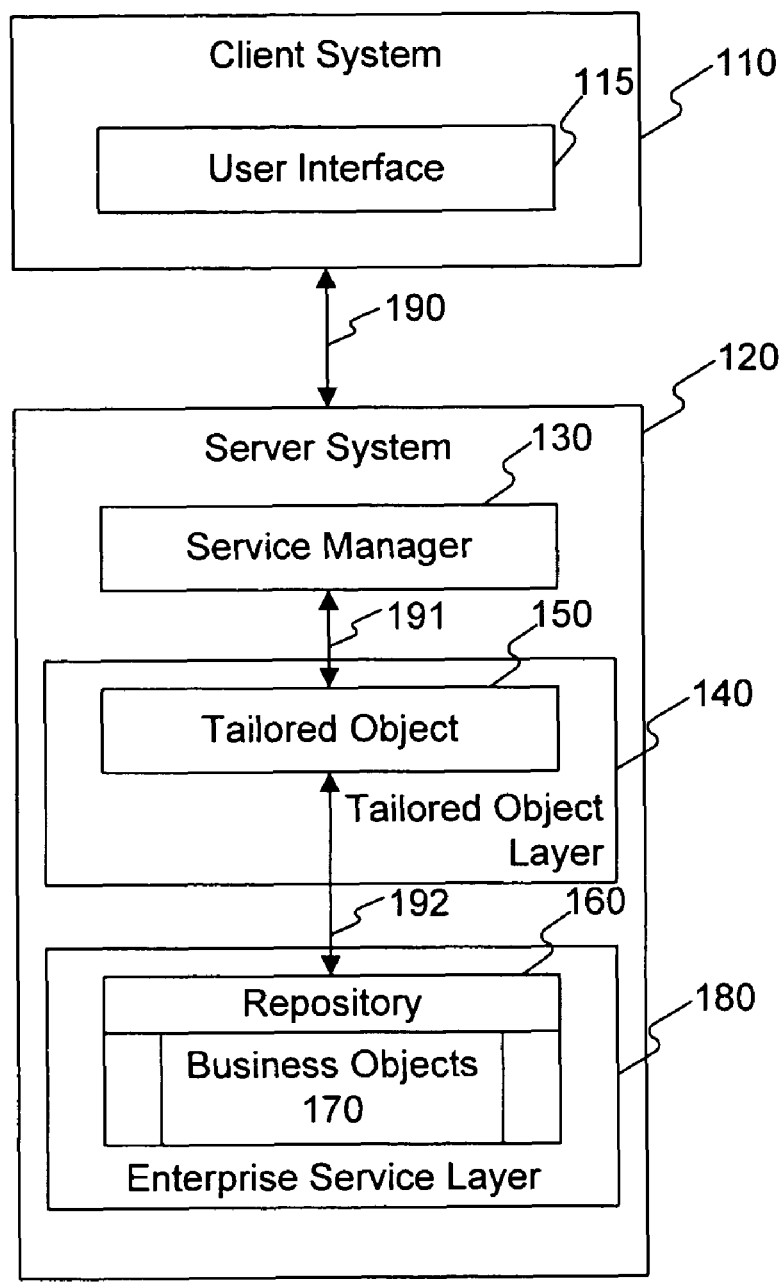
FIG. 1 is a block diagram of an exemplary system environment consistent with the present invention.

FIG. 1 is a block diagram of an exemplary system environment 100 consistent with the present invention. As shown in FIG. 1, system 100 may include a client system 110 and a server system 120. Although FIG. 1 depicts only one single client system 110 and server system 120, system 100 may include any number of client and server systems. In addition, the entities depicted in FIG. 1 may be at one location or distributed among multiple locations.

Client system 110 may include one or more processors, such as computers, to interface with other computers, such as server system 120. Client system 110 may connect to server system 120 through network connection 190. Client system 110 may also include a user interface 115 that may provide an interface allowing a user to interact with server system 120. User interface 115 may include a browser to provide content from server system 120. In one embodiment, SAP Web Dynpro, which is commercially available from SAP AG, Walldorf, Germany, may be used as a model-based development environment for generating user interface 115. Further, user interface 115 may be generated based on a floor plan, which, as known in the art, may define a blueprint or design of the user interface based on general design principles known to those of ordinary skill in the art. For instance, the floor plan may include the Quick Activity Floor Plan (QAF), the Object Instance Floor Plan (OIF), and the Guided Activity Floor Plan (GAF).

Server system 120 may include one or more processors, such as computers, to interface with other computers, such as client system 110. Server system 120 may be implemented as or as part of an SOA, but may use any other architecture or framework. In one exemplary embodiment, server system 120 may be implemented as an Enterprise Services Framework (ESF), which is commercially available from SAP AG, Walldorf, Germany. In general, server system 120 may host a service manager 130, a tailored object layer 140, and an enterprise service layer 180, and provide any architectural support, as known in the art, for its components. Tailored object layer 140 may further include tailored object 150, and enterprise service layer 180 may further include a repository 160 storing, for example, business objects 170.

Although FIG. 1 shows service manager 130 within server system 120, service manager 130 may be located anywhere in system 100 and/or distributed among multiple locations. In operation, user interface 115 in client system 110 may call service manager 130 in service system 120 to notify it of a user interface event. In response, service manager 130 may notify a tailored object 150 of the event and send a request to business objects 170 to process the user interface event.

Figure 2:
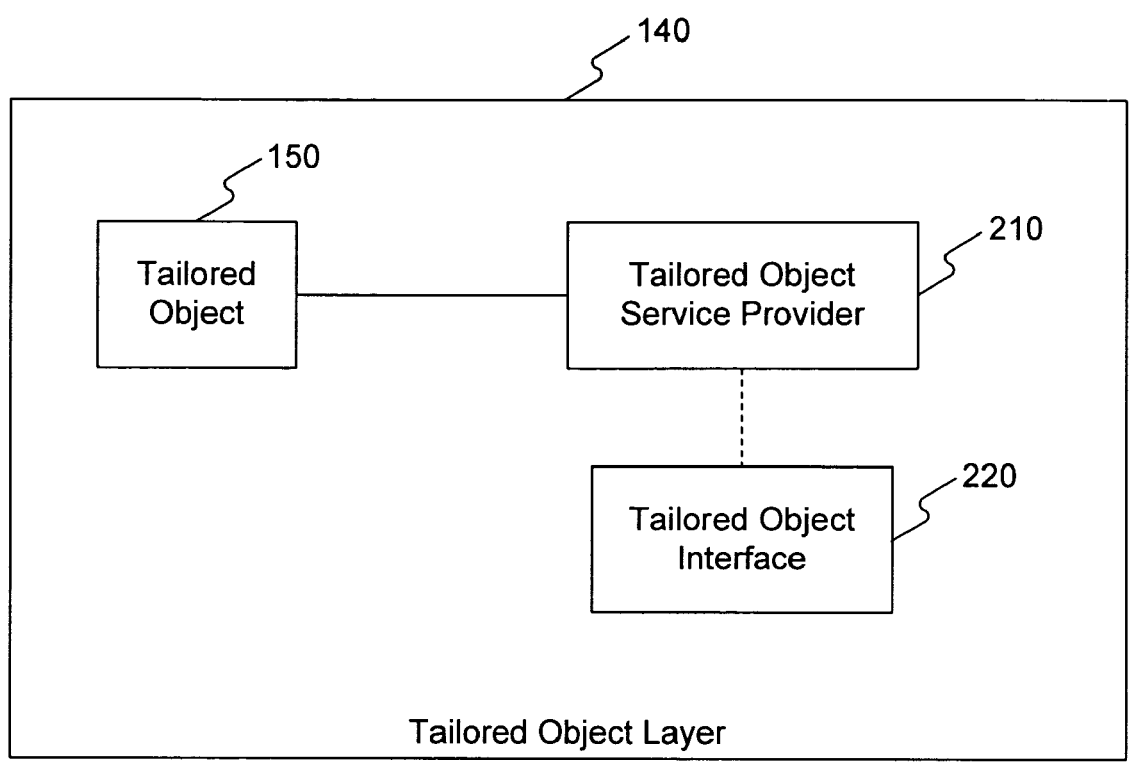
FIG. 2 is a further illustration of an exemplary embodiment, consistent with the present invention, of a tailored object layer.

Tailored object layer 140 may be a new architectural layer and may include tailored object 150 and related components, as described in more detail with respect to FIG. 2. Tailored object 150 may be a new business object classification and may support all known meta entities, such as queries, associations, actions, and properties, as well known in the art. Within tailored object layer 140, tailored object 150 may use business objects 170 and tailored object related entities to support user interface scenarios. In one exemplary embodiment, tailored object layer 140 and tailored object 150 may be seamlessly integrated in system 100. For example, existing modeling tools of a repository 160 may be used to model components of tailored object layer 140. To this end, proxy generation and runtime may seamlessly recognize and work with components of tailored object layer 140.

As noted above, enterprise service layer 180 may include a repository 160, which may contain business objects 170.

Although only repository 160 and business objects 170 are shown within enterprise service layer 180 in FIG. 1, any other entities, such as enterprise services and business object (BO) service providers, may be part of enterprise service layer 180. Such BO service providers may provide services associated with business objects 170. Repository 160 may be implemented as any type of storage device for storing information associated with business objects 170. Repository 160 may be located anywhere and distributed among multiple locations.

Network connections 190, 191, and 192 may be any type of communications mechanism and may include, alone or in any suitable combination, a telephony-based network, a local area network (LAN), a wide area network (WAN), a dedicated Intranet, wireless LAN, the Internet, an Intranet, a wireless network, a bus, or any other communication mechanisms. Further, any suitable combination of wired and/or wireless components and systems may provide network connections 190, 191, and 192. Moreover, network connections 190, 191, and 192 may be embodied using bidirectional, unidirectional, or dedicated communication links. Network connections 190, 191, and 192 may also implement standard transmission protocols, such as Transmission Control Protocol/Internet Protocol (TCP/IP), Hyper Text Transfer Protocol (HTTP), Simple Object Access Protocol (SOAP), Remote Procedure Calls (RPC), or other protocols.

FIG. 2 is a further illustration of an exemplary embodiment, consistent with the present invention, of a tailored object layer 140. As shown in FIG. 2, tailored object layer 140 may include tailored object 150, a tailored object service provider 210, and a tailored object interface 220. In one exemplary embodiment, tailored object 150 may include any information and provide any services necessary to support a floor plan of user interface 115. For example, tailored object 150 may include nodes containing the business data from business objects 170 that may be displayed in user interface 115. Tailored object 150 may also include any meta entities containing any additional information about the business data or the services that it may provide. As described above, such meta entities may include queries, associations, actions, and properties.

Tailored object 150 may provide any services necessary to support user interface 115 by delegating the service requests to tailored object service provider 210. The services associated with tailored object 150 may be related to the services associated with business objects 170, and may be defined as method signatures in tailored object interface 220, as described in greater detail below with respect to FIG. 3. Each of the method signatures may include a name of a service, an access level of the service e.g., public or protected, input parameters of the service, and an output type of the service. The services may then be implemented in tailored object service provider 210 according to the method signatures defined in tailored object interface 220. Once implemented, tailored object service provider 210 may provide any services associated with tailored object 150. For example, tailored object service provider 210 may fetch or calculate appropriate field content of user interface 115 or implement the logic for additional queries, actions, and associations included in tailored object 150.

Tailored object interface 220 may be an init interface, an interaction interface, an access interface, a query interface, an action interface, a message interface, a value help interface, or an incident context interface, each of which are known to those skill in the art. Although only one tailored object interface 220 is depicted in FIG. 2, layer 150 may include any number of interfaces 220.

Figure 3:
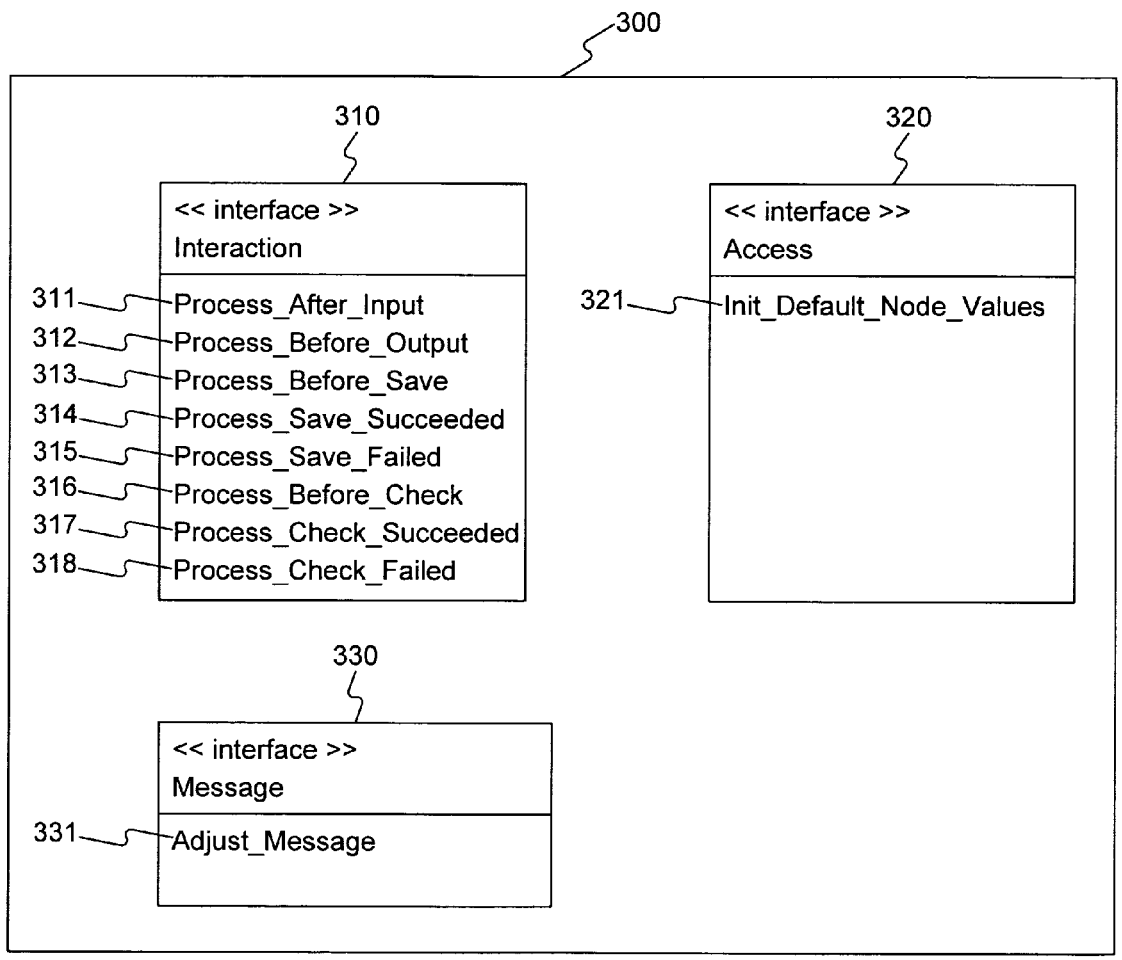
FIG. 3 is an exemplary class diagram of an interaction interface, a message interface, and an access interface, consistent with the present invention, for implementing an exemplary embodiment of a tailored object interface.

FIG. 3 is an exemplary class diagram 300 of an interaction interface 310, an access interface 320, and a message interface 330 for implementing an exemplary embodiment of tailored object interface 220. Interaction interface 310 may contain a plurality of method signatures of services associated with tailored object 150, such as method signatures 311, 312, 313, 314, 315, 316, 317, and 318. Method signatures may need to be implemented in tailored object service provider 210 before they may be invoked as methods. Method signature 311 may be Process_After_Input and its implemented method may be invoked when service manager 130 may send a PAI notification to tailored object 150, as described in greater detail with respect to FIG. 6. Method signature 312 may be Process_Before_Output and its implemented method may be invoked when service manager 130 may send a PBO notification to tailored object 150, as described in greater details with respect to FIG. 6. Process_After_Input and Process_Before_Output may provide brackets around a complete processing phase in the backend.

Each user interface event may be supported by, for example, three method signatures from interaction interface 310: Process_Before_<event_name>, Process_<event_name>_Succeeded, and Process_<event_name>_Failed. For example, user interface event "Save" may be supported by method signatures 313, 314, and 315. Method signature 313 may be Process_Before_Save and its implemented method may be invoked when service manager 130 may send a pre-service operation notification to tailored object 150, as described in greater detail with respect to FIG. 6. Method signature 314 may be Process_Save_Succeeded and its implemented method may be invoked when service manager 130 may send a post-service notification of success to tailored object 150, as described in greater detail with respect to FIG. 6. Method signature 315 may be Process_Save_Failed and its implemented method may be invoked when service manager 130 may send a post-notification of failure to tailored object 150, as described in greater detail with respect to FIG. 6. Similarly, user interface event "Check" may be supported by method signatures 316 (Process_Before_Check), 317 (Process_Check_Succeeded), and 318 (Process_Check_Failed).

Access interface 320 may contain method signature 321. Method signature 321 may be Init_Default_Node_Values and its implemented method may be used by tailored object 150 to fetch the adequate default values from preinitialized business objects 170. Message interface 330 may contain a method signature 331. Method signature 331 may be Adjust_Message and its implemented method may be invoked by server system 120 each time a message may be raised by one of business objects 170. When Adjust_Message may be invoked, tailored object service provider 210 may replace or remove the message.

Figure 4:
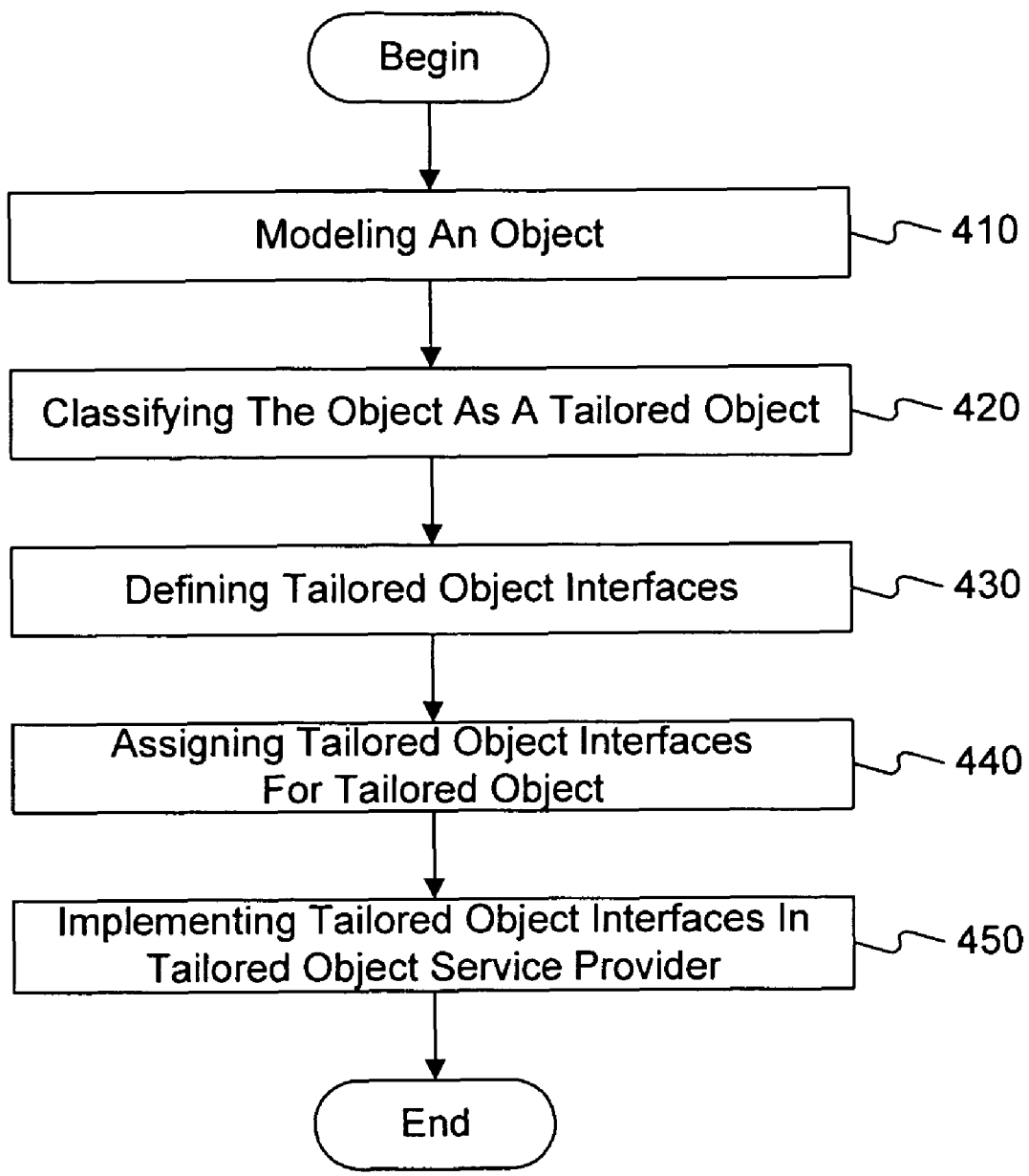
FIG. 4 is a flow diagram illustrating an exemplary process, consistent with the present invention, for implementing a tailored object layer.

FIG. 4 is a flow diagram illustrating an exemplary process 400, consistent with the present invention, for implementing tailored object layer 140. As shown in FIG. 4, in one embodiment, process 400 may model an object with business object like structures (step 410). For example, the object may contain nodes that may be similar to BO nodes. To this end, the object may be modeled, for example, by using modeling techniques and tools for business objects well known to those of ordinary skill. The modeled object may then be classified as a tailored object (step 420). In this regard, systems and methods consistent with the invention may use special semantics to classify an object as a tailored object. These semantics may be described by naming conventions, and additional properties may be introduced in the development process throughout the complete stack, including repository, service runtime, and user interface. Process 400 may then define tailored object interface 220 (step 430). For instances, tailored object interface 220 may be defined to include method signatures of services associated with tailored object 150.

Process 400 may then assign tailored object interface 220 for tailored object 150 (step 440). In one exemplary embodiment, server system 120 may use a proxy generation to recognize the classification of step 420 and assign tailored object interface 220 for tailored object 150. Process 400 may then implement tailored object interface 220 in tailored object service provider 210 (step 450).

Figure 5:
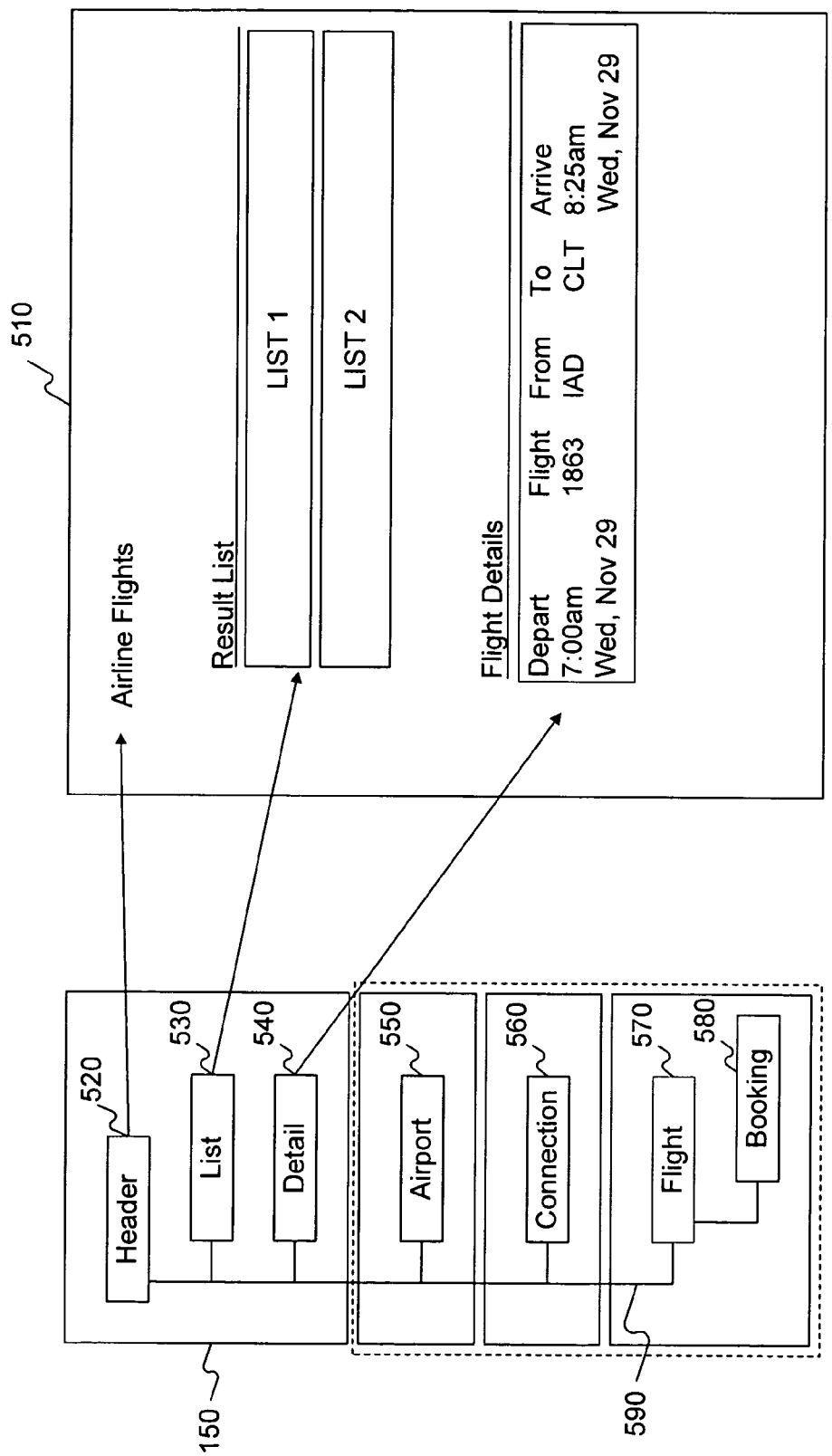
FIG. 5 is a functional illustration of an exemplary tailored object consistent with the present invention.

FIG. 5 is a functional illustration of an exemplary tailored object 150 consistent with the present invention. Tailored object 150 may contain and provide information to support a desired floor plan, such as a floor plan 510, of user interface 115. As well known in the art, a floor plan may be a special blueprint for a user interface following general design principles. In one embodiment, floor plan 510 may be the Quick Activity Floor Plan (QAF), the Object Instance Floor Plan (OIF), or the Guided Activity Floor Plan (GAF). Floor plan 510 may be designed by a user interface design tool. For example, Visual Composure, which is commercially available from SAP AG, Walldorf, Germany, may be used to design floor plan 510. In one embodiment, a pattern engine may interpret floor plan 510 at runtime to generate a user interface. For example, the Web Dynpro pattern engine, which is commercially available from SAP AG, Walldorf, Germany, may be used to interpret floor plan 510 to generate a user interface.

In exemplary embodiments, tailored object 150 may contain any data that may be displayed on a user interface screen (not shown) under the design of floor plan 510. For example, as shown in FIG. 5, floor plan 510 may include a header, a list, and a detail section of a business object. Tailored object 150 may therefore contain a header node 520, a list node 530, and a detail node 540 associated with details of a business object to provide any necessary data to support floor plan 510. Tailored object 150 may not, however, in exemplary embodiments, contain any layout and rendering information. For example, tailored object 150 may not provide any information about displayed positions of headers, lists, or details on a user interface screen (not shown). For the purposes of supporting floor plan 510, tailored object 150 may have nodes that may contain redundant information, which may not be allowed in business objects. Tailored object 150 may also contain meta entities, such as a cross-BO association 590.

Tailored object 150 may access business objects 550, 560, 570, and 580 (as shown in the dashed box of FIG. 5), and obtain only the data necessary to support floor plan 510. For example, tailored object 150 may relate to booking an airline flight. In this example, tailored object 150 may obtain airport information from business object 550, connection information from business object 560, flight information from business object 570, and booking information from business object 580 only to the extent necessary to support floor plan 510. Tailored object 150 may not obtain information that may not be needed by floor plan 510 from business objects 550, 560, 570, and 580. Tailored object 150 may also use information obtained from one or more business objects to obtain information from other business objects by cross-BO association 590. For example, tailored object 150 may obtain a flight number associated with a specific connection from business object 560 and then use the flight number to obtain the details of the flight information associated with the flight number from business object 570. Tailored object 150 may also control the modifications of business objects 550, 560, 570, and 580 to the extent necessary to support floor plan 510. Business objects 550, 560, 570, and 580 may be part of business objects 170.

Figure 6:
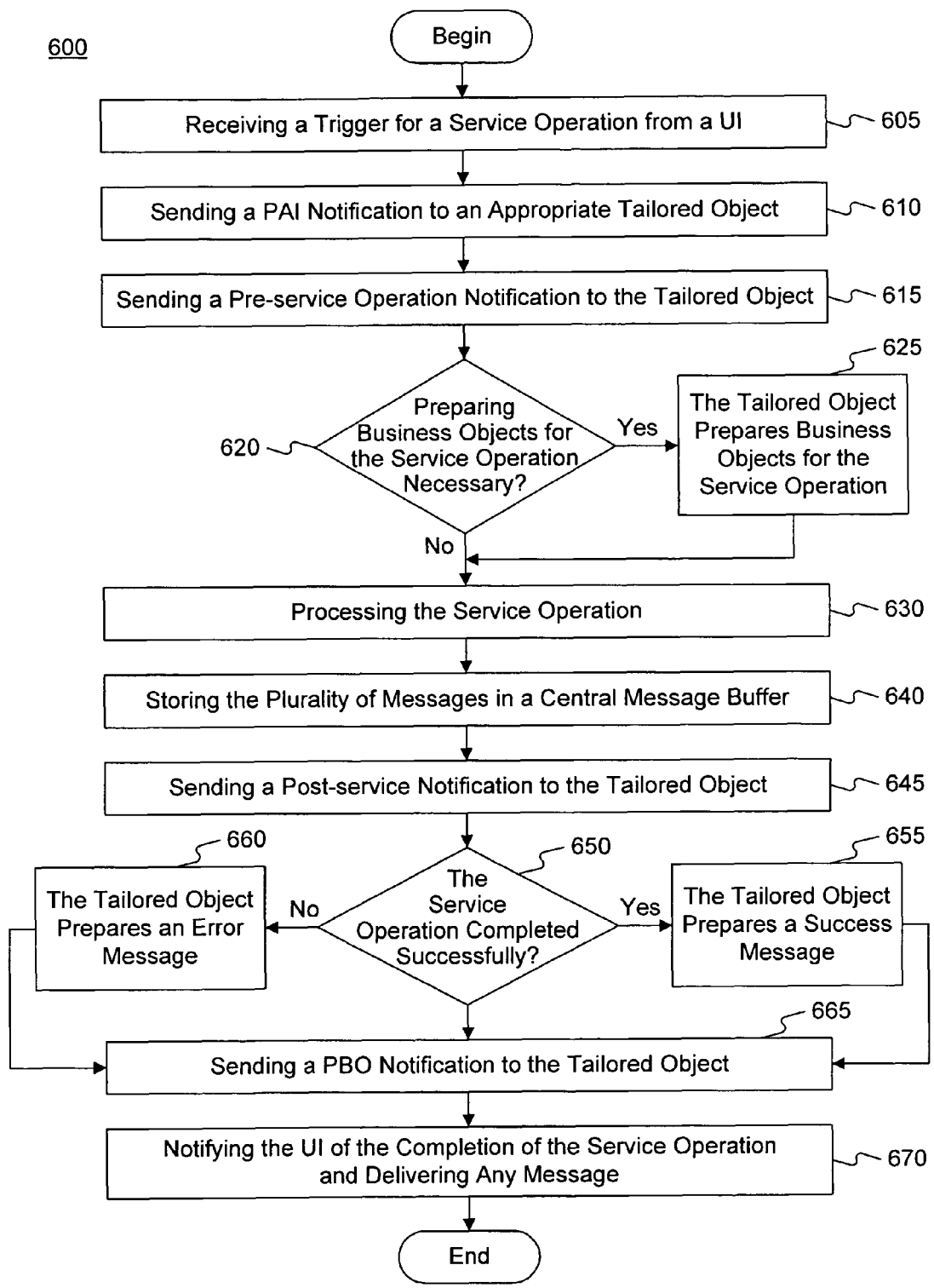
FIG. 6 is a flow diagram illustrating an exemplary message handling process consistent with the present invention.

FIG. 6 is a flow diagram illustrating an exemplary message handling process 600 consistent with the present invention. As shown in FIG. 6, user interface 115 may fire an event trigger for a service operation (step 605). Service manager 130 may receive the trigger and, in response, may send a PAI (Processing After Input) notification to tailored object 150 (step 610). Tailored object 150 may then perform any tasks that may be processed as PAI. Such tasks may include, for example, backing up business objects 170 that may be modified during the service operation or creating a transaction for a service operation. A PAI notification may mark the start of a service operation.

Service manager 130 may then send a pre-service operation notification to tailored object 150 (step 615). The pre-service operation notification may include information to identify the triggered user event. Tailored object 150 may receive the notification and prepare business objects 170 for the service operation if necessary (steps 620 and 625). Tailored object 150 may include information to determine when it may be necessary to prepare which business objects in response to which service operations. Tailored object service provider 210 may provide any services necessary to prepare business objects 170. For example, in "Save" operation, tailored object service provider 210 may synchronize buffered data stored in tailored object 150 with business objects 170. Preparing business objects 170 by tailored object 150 in the "Save" operation context may, thus, be analogous to the prepare phase of two phase commit, as well known in the art. If synchronization with any one of business objects 170 may fail, changes may be rolled back to restore business objects 170 before changes may be committed to repository 160. Service manager 130 may then send service operation requests to business objects 170, and business objects 170 may process the service operation (step 630). In the "Save" operation context, processing the service operation may be analogous to the commit phase of two phase commit, as well known in the art.

All messages raised by business objects 170 while performing the service operation may be stored in a central message buffer (step 640). The central message buffer may be implemented as a storage device, such as a database or a collection object, as well known in the art. With the implementation of the central message buffer, messages may have lifetimes, which may be much longer than the time between two communication requests. As a result, messages may be managed. Each message may have a unique identifier to support the message management, and tailored object 150 may control the message management. The central message buffer may provide interfaces for controlling the message lifetime, such as creating, modifying, and deleting messages.

After the service operation may be completed, service manager 130 may send a notification of success or failure to tailored object 150 (step 645). Upon a notification of success (step 650, Yes), tailored object 150 may prepare a success message that may be fit for user interface 115 (step 655). Upon a notification of failure, (step 650, No), tailored object 150 may condense or consolidate the stored error messages in the central message buffer, and prepare an error message that may be fit for user interface 115 (step 660). Tailored object 150 may temporarily store unique identifiers of all error messages raised by business objects 170 during a service operation, and may use the unique identifiers to retrieve all the error messages from the central message buffer to prepare a single error message.

Service manager 130 may send a PBO (Processing Before Output) notification to tailored object 150 (step 665). Tailored object 150 may perform any tasks that may be processed as PBO. For example, tailored object 150 may take care of the final adjustment of messages, change notifications, or properties. In addition, user interface state and screen information may be prepared to the extent necessary to support the user interface in the best possible way. A PBO notification may mark the end of a service operation. Service manager 130 may then send the message prepared by tailored object 150 to user interface 115 (step 670).

Figure 7:
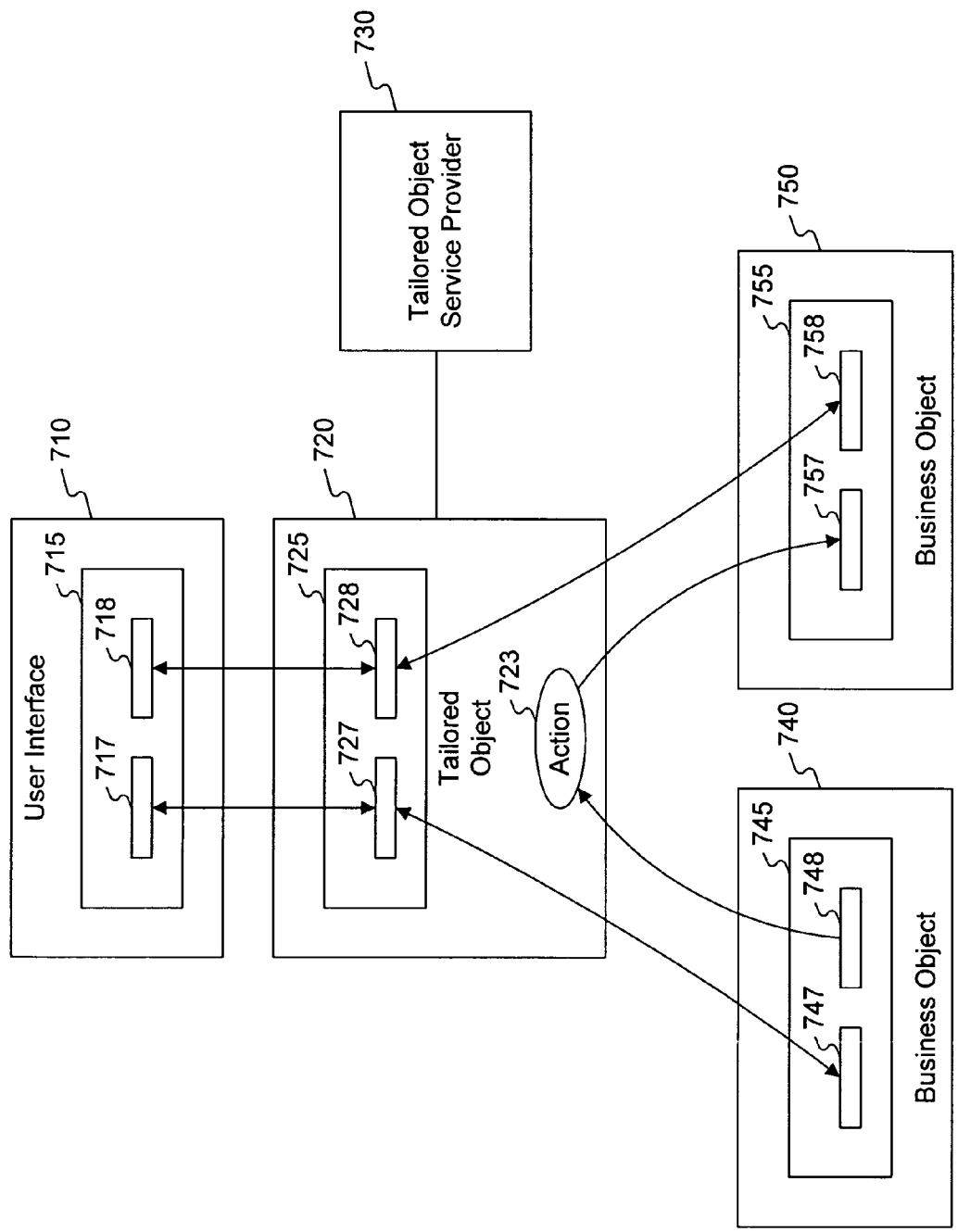
FIG. 7 is a functional illustration of an role of a tailored object in an exemplary modification handling process.

FIG. 7 is a functional illustration of an role of tailored object 720 in an exemplary modification handling process. A user interface 710 may include a list 715. List 715 may include fields 717 and 718. A tailored object 720, which may be another embodiment of tailored object 150, may include a node 725, which may be associated with list 715. Node 725 may include node elements 727 and 728. Tailored object 720 may also include meta entitles, such as an action 723. Further, a business object 740 may include a business object (BO) node 745. BO node 745 may include business object (BO) node elements 747 and 748. FIG. 7 also shows a business object 750, which may include a BO node 755. BO node 755 may include BO node elements 757 and 758.

Field 717 of user interface 710 may display data from node element 727, and field 718 of user interface 710 may display data from node element 728. Tailored object 720 may retrieve data from BO node element 747 for node element 727. Tailored object 720 may retrieve data from BO node element 758 for node element 728. When fields 717 and 718 may be modified, the modifications may need to be sent back to node elements 727 and 728, and then synchronized with BO node elements 747 and 758. Server system 160 may provide a proxy to make sure that retrieval and modification may be delegated to the correct business object. Synchronizing with BO node elements 747 and 758 may, in some embodiments, occur not immediately after fields 717 and 718 are modified. A tailored object service provider 730, which may be another embodiment of tailored object service provider 210, may decide when it may be an appropriate time to synchronize and send the modifications to business objects 740 and 750. For example, synchronization may take place while tailored object 720 may prepare business objects 740 and 750 for a service operation, as in step 625 described above. Additional synchronization points may be supported for controlling a guided activity. For example, a completion of an activity step may be another synchronization point. After synchronizing with business objects 740 and 750, modifications to BO node elements 747 and 758 may be committed when a "Save" service operation may be processed, as in step 630 described above.

There may be instances where fields 717 and 718 may need to be displayed to a user while BO node elements 747 and 758 may not have been initialized. Attempts to retrieve a value from preinitialized BO node elements 747 and 758 for display may lead to error messages due to missing and needed data. Tailored object 720, therefore, may fetch adequate default values from business objects 740 and 750 to avoid such a problem. In order to distinguish initial attributes from empty attributes of BO node elements 747 and 758, and to properly fetch default values, tailored object 720 may manage a buffer (not shown) of preinitialized BO node elements 747 and 758. The buffer may be implemented as a storage device, such as a database or a collection object, as well known in the art.

Tailored object 720 may also control cross modifications of business objects 740 and 750. For example, a requirement that creation of BO node element 748 may need an adjustment in BO node element 757 may be performed as meta entities, such as an action 723. All necessary adjustment logic may be implemented and provided by tailored object service provider 730. Similarly, target-defined associations may also be modeled in tailored object 720. The necessary logic to combine a source BO node with a target BO node may be implemented and provided in tailored object service provider 730.

One of ordinary skill in the art will recognize that while FIG. 4 and FIG. 6 illustrate the above steps in a particular order, the order in which the stages are carried out is irrelevant. Systems consistent with the invention may carry out the stages in any order without departing from the scope of the present disclosure.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for managing user interface events for a user interface of a client system, the system comprising:
    a service layer including a business object;
    an intermediate object layer comprising:
    an intermediate object including a node element associating the business object with the user interface, the intermediate object controlling message management of user interface messages associated with the business object and retrieving data from the business object for display on the user interface;
    an intermediate object interface containing a plurality of method signatures for executing a plurality of service requests on the business object; and
    an intermediate object service provider configured to execute the service requests, in response to an event trigger received from the user interface, based on the method signatures;
    a central message buffer configured to:
    store the user interface messages, wherein the user interface messages are associated with a unique identifier and a message lifetime to support the message management;
    provide an interface for the message management, wherein the message management includes creating, modifying, and deleting the user interface messages to prepare the user interface messages for display on the user interface; and
    provide an interface for consolidating the user interface messages, wherein consolidating the user interface messages includes identifying the user interface messages using the associated unique identifiers, deleting the identified user interface messages, and replacing the deleted user interface messages with a consolidated message; and
    a service manager that provides the retrieved data from the intermediate object and the user interface messages to the user interface for display; and
    a processor executing at least the service manager.

2. The system of claim 1, wherein the intermediate object further comprises:
    a node containing retrieved data from the business object for the user interface; and
    a data element identifying at least one of a query, an association, an action, or a property associated with the business object, wherein the data element contains information describing the retrieved data for the user interface.

3. The system of claim 1, further comprising a storage device for storing preinitialized node elements of the business object.

4. The system of claim 3, wherein at least one of the method signatures relates to a service request of fetching default values for the preinitialized node elements in the storage device for the user interface.

5. The system of claim 1, wherein
the service layer further includes a second business object,
the intermediate object includes information identifying cross-modifications of the business object and the second business object, and
a cross-modification represents a scenario in which a modification, creation, or deletion of the business object requires a modification, creation, or deletion of the second business object.

6. A computer-implemented method for managing user interface events for a user interface of a client system, the method comprising:
implementing, by a processor associated with the computer, an intermediate object layer, the intermediate object layer comprising:
an intermediate object including a node element associating a business object included in a service layer with the user interface, the intermediate object controlling message management of user interface messages associated with the business object and retrieving data from the business object for display on the user interface;
an intermediate object interface containing a plurality of method signatures for executing a plurality of service requests on the business object; and
an intermediate object service provider configured to execute the service requests, in response to an event trigger received from the user interface, based on the method signatures;
implementing, by the processor, a central message buffer configured to:
store the user interface messages, wherein the user interface messages are associated with a unique identifier and a message lifetime to support the message management;
provide an interface for the message management, wherein the message management includes creating, modifying, and deleting the user interface messages to prepare the user interface messages for display on the user interface; and
provide an interface for consolidating the user interface messages, wherein consolidating the user interface messages includes identifying the user interface messages using the associated unique identifiers, deleting the identified user interface messages, and replacing the deleted user interface messages with a consolidated message; and
integrating, by the processor, the intermediate object layer with the service layer including the business object; and
providing, by the processor, the retrieved data from the intermediate object and the user interface messages to the user interface for display.

7. The method of claim 6, wherein the intermediate object further comprises:
a node containing retrieved data from the business object for the user interface; and
a data element identifying at least one of a query, an association, an action, or a property associated with the business object, wherein the data element contains additional information describing the retrieved data for the user interface.

8. The method of claim 6, further comprising:
storing preinitialized node elements of the business object in a storage device.

9. The method of claim 8, wherein at least one of the method signatures relates to a service request of fetching default values for the preinitialized node elements in the storage device for the user interface.

10. The method of claim 6, wherein,
the service layer further includes a second business object,
the intermediate object includes information identifying cross-modifications of the business object and the second business object, and
a cross-modification represents a scenario in which a modification, creation, or deletion of the business object requires a modification, creation, or deletion of the second business object.

11. A computer-readable medium comprising instructions to configure a computer to implement a method for managing user interface events for a user interface of a client system, the method comprising steps performed by a computer of:
implementing an intermediate object layer comprising:
an intermediate object including a node element associating a business object included in a service layer with the user interface, the intermediate object controlling message management of user interface messages associated with the business object and retrieving data from the business object for display on the user interface;
an intermediate object interface containing a plurality of method signatures for executing a plurality of service requests on the business object; and
an intermediate object service provider configured to execute the service requests, in response to an event trigger received from the user interface, based on the method signatures;
implementing a central message buffer configured to:
store the user interface messages, wherein the user interface messages are associated with a unique identifier and a message lifetime to support the message management;
provide an interface for the message management, wherein the message management includes creating, modifying, and deleting the user interface messages to prepare the user interface messages for display on the user interface; and
provide an interface for consolidating the user interface messages, wherein consolidating the user interface messages includes identifying the user interface messages using the associated unique identifiers, deleting the identified user interface messages, and replacing the deleted user interface messages with a consolidated message; and
integrating the intermediate object layer with the service layer including the business object; and
providing the retrieved data from the intermediate object and the user interface messages to the user interface for display.

12. The computer-readable medium of claim 11, wherein the intermediate object further comprises:
a node containing retrieved data from the business object for the user interface; and
a data element identifying a query, an association, an action, and a property associated with the business object, wherein the data element contains additional information describing the retrieved data for the user interface.

13. The computer-readable medium of claim 11, wherein the method for managing user interface events further comprises:

storing preinitialized node elements of the business object in a storage device; and fetching, using at least one of the method signatures, default values for the preinitialized node elements in the storage device for the user interface by the intermediate object.

14. The computer-readable medium of claim 11, wherein the service layer further includes a second business object, the intermediate object includes a data element identifying cross-modifications of the business object and the second business object, and a cross-modification represents a scenario in which a modification, creation, or deletion of the business object requires a modification, creation, or deletion of the second business object.

15. A computer-implemented method for handling messages generated from a service layer including a business object in a user interface scenario, the method comprising steps performed by a computer of:

receiving a trigger for a service operation on the business object from a user interface;

sending a pre-service operation notification to an intermediate object layer, the intermediate object layer comprising:

an intermediate object including a node element associating the business object included in the service layer with the user interface;

an intermediate object interface containing a plurality of method signatures for executing a plurality of service operations on the business object; and an intermediate object service provider configured to execute the service operations, in response to a trigger received by the user interface, based on the method signatures;

processing, by the intermediate object service provider using a first of the method signatures, the service operation by sending a service operation request to the business object;

receiving a plurality of user interface messages associated with the business object from the processing of the service operation wherein the user interface messages are associated with a unique identifier and a message lifetime to support message management;

storing the user interface messages in a central message buffer;

sending, by the intermediate service provider using a second of the method signatures, a post-service operation notification to the intermediate object;

managing, by the intermediate object using a third of the method signatures, the user interface messages in the central message buffer, wherein the managing includes creating, modifying, and deleting the user interface messages to prepare the user interface messages for display on the user interface;

consolidating the user interface messages by identifying the user interface messages using the associated unique identifiers, deleting the identified user interface messages, and replacing the deleted user interface messages with a consolidated message; and sending the user interface messages to the user interface for display.

16. The method of claim 15, wherein sending the pre-service operation notification further comprises:

preparing, by the intermediate object, the business object for the service operation.

\* \* \* \* \*